(12) United States Patent
Labiaga et al.

(10) Patent No.: US 9,864,517 B2
(45) Date of Patent: Jan. 9, 2018

(54) ACTIVELY RESPONDING TO DATA STORAGE TRAFFIC

(71) Applicant: NetApp, Inc., Sunnyvale, CA (US)

(72) Inventors: Ricardo Labiaga, Sunnyvale, CA (US); Ravi Krishna, Bangalore (IN); Deepak Kenchammana-Hosekote, San Jose, CA (US); Gokul Soundararajan, Sunnyvale, CA (US); Craig Chadwell, Sunnyvale, CA (US); Lakshmi Narayanan Bairavasundaram, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 207 days.

(21) Appl. No.: 14/489,253

(22) Filed: Sep. 17, 2014

(65) Prior Publication Data
US 2015/0081871 A1    Mar. 19, 2015

Related U.S. Application Data

(60) Provisional application No. 62/018,523, filed on Jun. 27, 2014, provisional application No. 61/878,972, filed on Sep. 17, 2013, provisional application No. 62/018,497, filed on Jun. 27, 2014.

(51) Int. Cl.
*G06F 15/173* (2006.01)
*G06F 3/06* (2006.01)
*G06F 9/50* (2006.01)
*H04L 29/08* (2006.01)

(52) U.S. Cl.
CPC .......... *G06F 3/0604* (2013.01); *G06F 3/067* (2013.01); *G06F 3/0653* (2013.01); *G06F 3/0659* (2013.01); *G06F 3/0662* (2013.01); *G06F 3/0665* (2013.01); *G06F 9/5027* (2013.01); *G06F 9/5072* (2013.01); *G06F 2003/0697* (2013.01); *H04L 67/1002* (2013.01); *H04L 67/1008* (2013.01)

(58) Field of Classification Search
CPC ...................................................... G06F 9/5027
USPC ......................................................... 709/223
See application file for complete search history.

(56) References Cited

U.S. PATENT DOCUMENTS

| 6,557,035 | B1 | 4/2003 | McKnight |
| 7,194,538 | B1 | 3/2007 | Rabe et al. |
| 7,685,269 | B1 | 3/2010 | Thrasher et al. |
| 8,224,993 | B1 | 7/2012 | Brandwine |
| 2002/0147511 | A1 | 10/2002 | Eryurek et al. |
| 2003/0149763 | A1 | 8/2003 | Heitman et al. |

(Continued)

OTHER PUBLICATIONS

Non-Final Office Action on co-pending U.S. Appl. No. 14/489,212 dated Apr. 8, 2016.

(Continued)

*Primary Examiner* — Kevin Mai
(74) *Attorney, Agent, or Firm* — Klein, O'Neill & Singh, LLP

(57) ABSTRACT

Technology is described for actively responding to data storage traffic. The technology can provide an application program interface; receive, via the application program interface, from an application, a command to query a data storage attribute associated with a virtual data storage component; query the associated virtual data storage component; and return to the application a value for the data storage attribute.

16 Claims, 4 Drawing Sheets

(56) References Cited

U.S. PATENT DOCUMENTS

| | | |
|---|---|---|
| 2004/0054656 A1 | 3/2004 | Leung et al. |
| 2004/0073675 A1 | 4/2004 | Honma et al. |
| 2004/0243699 A1 | 12/2004 | Koclanes et al. |
| 2006/0002705 A1 | 1/2006 | Cline et al. |
| 2006/0029097 A1 | 2/2006 | McGee et al. |
| 2006/0236056 A1 | 10/2006 | Nagata |
| 2007/0074076 A1 | 3/2007 | Imai et al. |
| 2007/0100977 A1 | 5/2007 | Barry |
| 2007/0118643 A1 | 5/2007 | Mishra et al. |
| 2009/0164660 A1 | 6/2009 | Abrams |
| 2009/0235269 A1 | 9/2009 | Nakajima et al. |
| 2010/0125753 A1 | 5/2010 | Gadher |
| 2010/0277307 A1 | 11/2010 | Horton et al. |
| 2012/0054763 A1 | 3/2012 | Srinivasan |
| 2012/0079097 A1* | 3/2012 | Gopisetty ............ G06F 9/5083 709/224 |
| 2013/0055290 A1 | 2/2013 | Gaikwad et al. |
| 2013/0086340 A1 | 4/2013 | Fleming et al. |
| 2013/0238795 A1 | 9/2013 | Geffin et al. |
| 2014/0089511 A1 | 3/2014 | McLean |
| 2014/0278623 A1* | 9/2014 | Martinez ................ G06Q 10/06 705/7.12 |
| 2015/0081836 A1 | 3/2015 | Soundararajan et al. |
| 2015/0081893 A1 | 3/2015 | Chadwell et al. |
| 2015/0261630 A1 | 9/2015 | Endo |
| 2015/0304234 A1 | 10/2015 | Salle et al. |

OTHER PUBLICATIONS

Final Office Action on co-pending U.S. Appl. No. 14/489,212 dated Sep. 1, 2016.
International Search Report dated Jan. 30, 2015 in International Patent Application No. PCT/US2014/056156.
Non-Final Office Action on co-pending U.S. Appl. No. 14/489,212 dated Jan. 3, 2017.
Non-Final Office Action on co-pending U.S. Appl. No. 14/489,077 dated Apr. 21, 2017.
Notice of Allowance on co-pending U.S. Appl. No. 14/489,212 dated May 12, 2017
Final Office Action on co-pending U.S. Appl. No. 14/489,077 dated Oct. 19, 2017.

* cited by examiner

ACTIVELY RESPONDING TO DATA STORAGE TRAFFIC

CROSS-REFERENCE TO RELATED APPLICATION(S)

This application claims the benefit of commonly assigned U.S. Provisional Patent Application Ser. No. 62/018,523, filed on Jun. 27, 2014, and entitled "ACTIVELY RESPONDING TO DATA STORAGE TRAFFIC"; U.S. Provisional Patent Application Ser. No. 61/878,972, filed on Sep. 17, 2013, and entitled "FABRIC-ATTACHED STORAGE SYSTEM"; and U.S. Provisional Patent Application Ser. No. 62/018,497, filed on Jun. 27, 2014, and entitled "PROFILE-BASED LIFECYCLE MANAGEMENT FOR DATA STORAGE SERVERS," the disclosures of which are incorporated herein in their entireties by reference.

BACKGROUND

Virtualization is a computing technique used for creating virtual instances of computing devices rather than physical instances of the computing devices. In hardware virtualization, a host computing device is a physical computing device that hosts virtual (or "guest") computing devices. Virtualization has been applied not only to computing devices and operating systems, but also to networking and storage systems.

Cloud computing is a term used to refer to a model of computing in which multiple computing devices provide various computing services via a network, e.g., an Intranet or the Internet. Cloud computing commonly employs virtualization to provide "virtual servers." Enterprises and other entities may use cloud computing instead of deploying data centers or may use cloud computing to provide supplementary "elastic" computing services. Elasticity is a benefit offered by cloud computing in that computing resources can be scaled up or down on the fly without affecting the end user.

Data storage servers, e.g., devices that provide services offered by storage area networks, are increasingly used in private data centers, cloud computing architectures. Moreover, enterprises may have multiple data storage servers (also referred to simply as "storage servers") in their data center and even multiple data centers. System administrators are commonly called on to provide improved storage services, e.g., by adding, maintaining, or retiring storage servers at appropriate times. However, appropriate management at scale can be difficult. For example, it may be difficult to determine how to configure storage servers to respond to storage demands from users, applications, etc.

DETAILED DESCRIPTION

Figure 1:
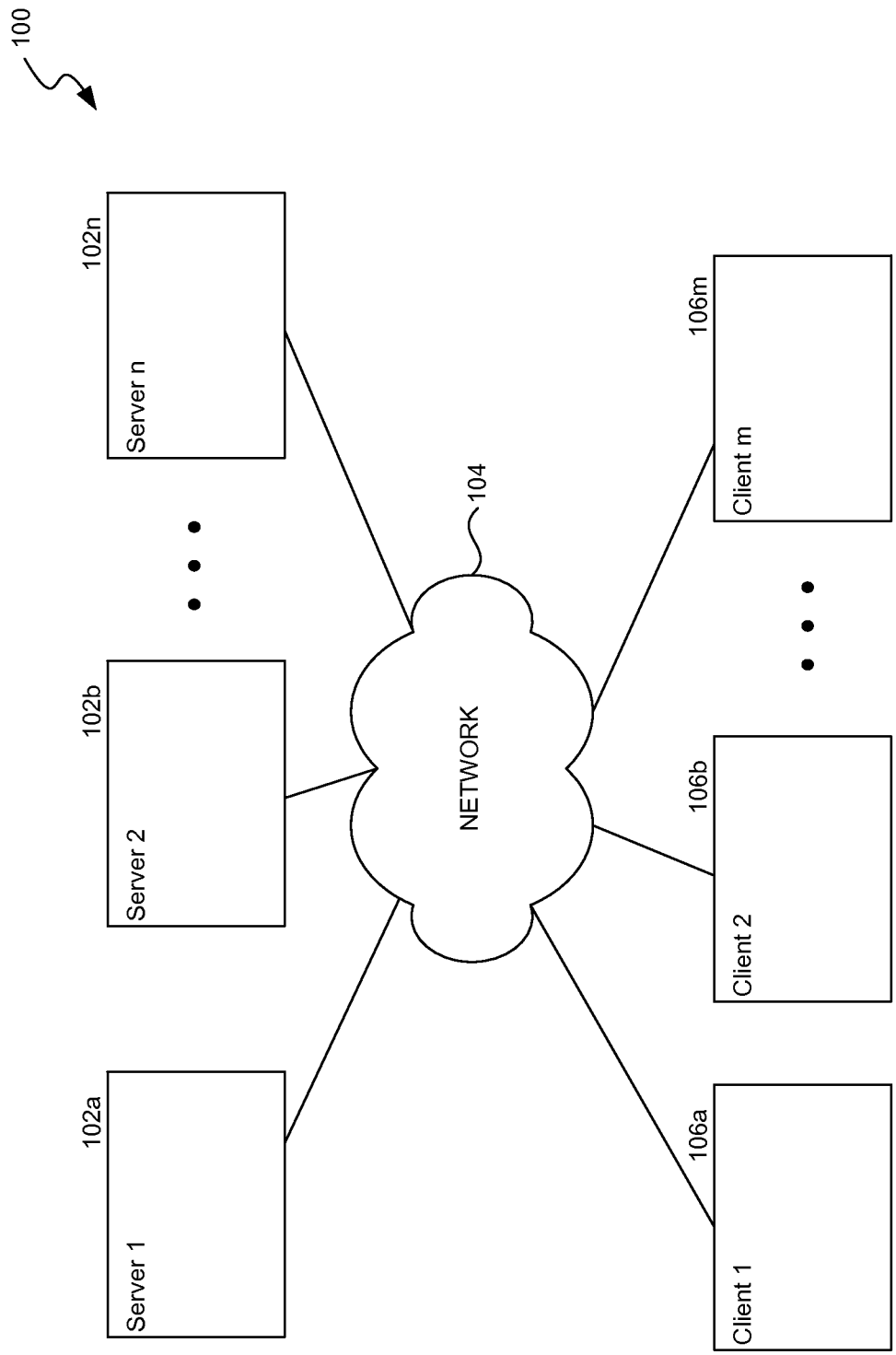
FIG. 1 is a block diagram illustrating various components in an environment in which the disclosed technology may operate in various embodiments.

Technology is disclosed for actively responding to data storage traffic ("the technology"). System administrators commonly configure a data storage services infrastructure based on anticipated storage needs. Over time, however, those storage needs may change. For example, data storage traffic may change over a period of days, weeks, months, or even years to respond to different types of use. As these data storage traffic patterns change, the demands on various data storage devices also varies. In a conventional data storage system, it can be possible to determine where data storage demands are at a peak ("hotspot"). However, making the same determination in a virtualized environment can be difficult, e.g., because data traffic targeting various data storage devices may all originate from or target a particular virtual data storage component (collectively, "endpoints"). In such cases, system administrators may benefit from being able to determine how best to reallocate virtual data storage components, e.g., to different physical servers.

The various virtual data storage components can provide application program interfaces (APIs) that enable an application, e.g., a management console, to query for various information associated with the virtual data storage components. As an example, a management console can query the various virtual data storage components to determine how much data (e.g., network traffic) the virtual data storage component is handling. This API thus enables "visibility" of data traffic flow at a highly granular level.

In various embodiments, the technology can selectively "instrument" the various virtual data storage components to quickly determine where the hotspots lie. As an example, the technology can first determine that a storage volume is hot and follow a path back to the source of the data being transmitted or requested from the storage volume, one storage component at a time. This can occur automatically, e.g., based on various events, crossing thresholds of performance (e.g., latency, capacity utilization, etc.), or manually, e.g., using a management console. In various embodiments, an application (e.g., database server, web server, etc.) may also be instrumented so that the technology can determine which application or even which portion of the application is causing hotspots. In some embodiments, the technology can identify which users are using which volumes or portions of data.

Thus, the technology employs agents that either reside in data storage components or communicate with the storage components, e.g., via an API provided by the agents. The data storage components can be volumes, server, networking components, servers, etc. The technology can then selectively enable and disable the various agents to determine which data storage components, endpoints, and/or users are causing the hotspots, e.g., to perform an impact analysis. The agents themselves may in turn employ APIs provided by the various data storage components, e.g., to receive data, turn instrumentation on or off, etc.

The technology can identify a hotspot at an application, an intermediary component, or a storage volume (whether physical or virtual) and selectively check data flows (e.g., each intermediary virtual or physical device) to diagnose the source of the data or network traffic. Once so determined, a system administrator can be alerted so that the system administrator can take various actions, e.g., to add capacity, solve problems, etc.

In various embodiments, the technology enables analysis of storage level data flows at a higher, "logical" level to recommend a particular storage configuration, e.g., to satisfy "service level objectives." Storage operations transiting virtual data storage components can be mirrored or duplicated at a workload analyzer. In various embodiments, the workload analyzer can be a virtual data storage component that receives a duplicated copy of data storage operations, e.g., from a virtual storage appliance or from a different virtual data storage component. The workload analyzer can review contents of network traffic, e.g., data indicating, at a storage layer level, a source, a destination, a type of data, and/or volume of data. As an example, the workload analyzer can determine which application is sending or requesting data, which logical storage volumes are targeted, etc. The workload analyzer can then compare the actual workload to previously specified service level objectives. The workload analyzer can then determine, e.g., based on statistics or simulations, what storage configuration changes can be made to satisfy the service level objectives. As examples, the workload analyzer may recommend addition of a cache, volume, storage server, etc. In various embodiments, the workload analyzer can perform this analysis and recommendation dynamically, e.g., by alerting a system administrator of predicted performance or capacity issues.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Turning now to the figures, FIG. 1 is a block diagram illustrating various components 100 in an environment in which the disclosed technology may operate in various embodiments. The components 100 can include one or more server computing devices, e.g., data storage server 102a, data storage server (also, "storage server") 102b, and data storage server 102n. The server computing devices 102 are described in more detail below in relation to FIG. 2. The server computing devices 102 can communicate with one or more client computing devices 106 over a network 104. The network 104 can be an intranet, the Internet, or a special-purpose network. Multiple client computing devices 106 (e.g., client computing devices 106a, 106b, and 106m) can communicate with the server computing devices 102, e.g., to store data.

Figure 2:
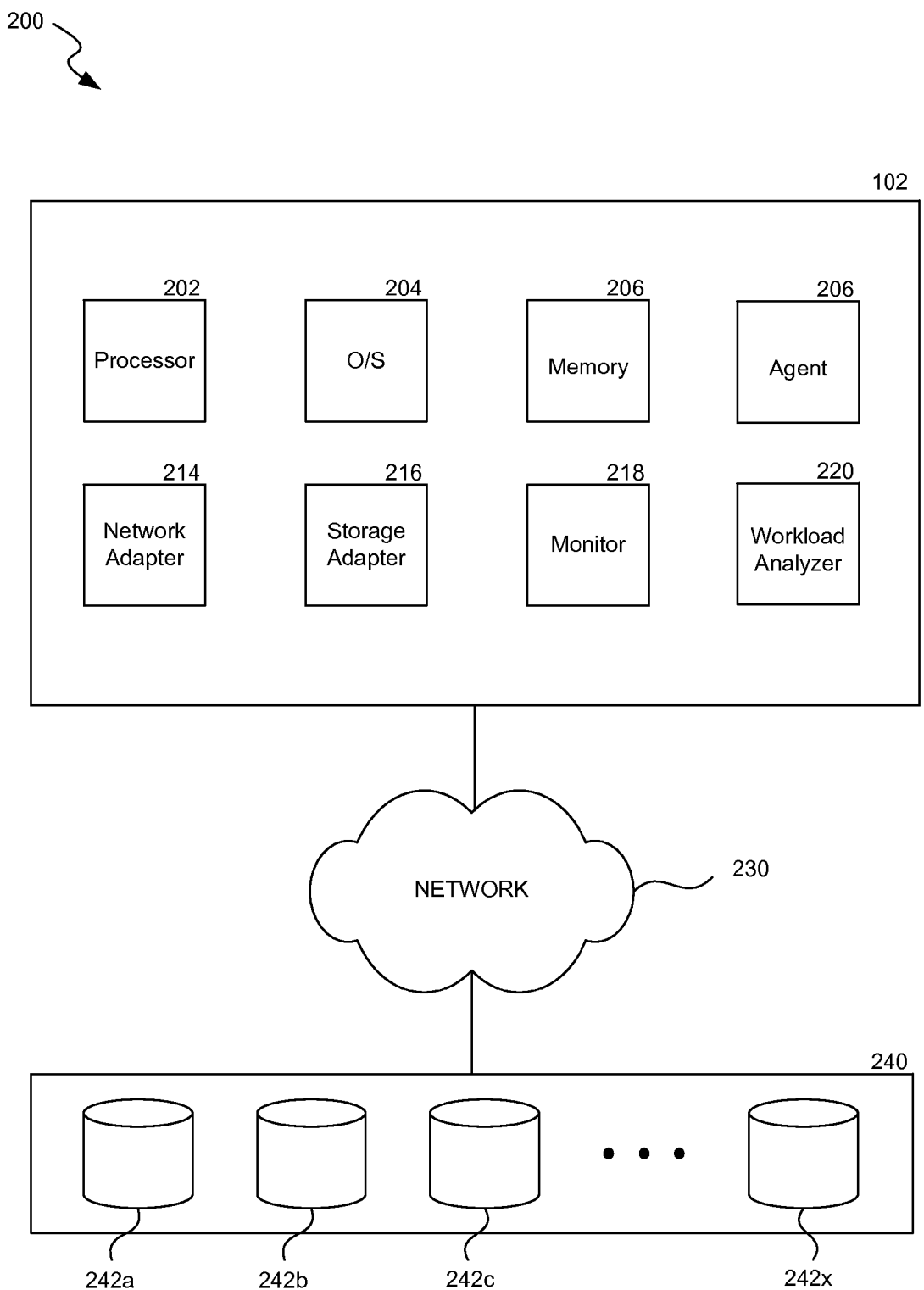
FIG. 2 is a block diagram illustrating various components of a data storage server.

FIG. 2 is a block diagram illustrating various components 200 of a data storage server 102. The data storage server 102 can be referred to as a network storage appliance or "filer" and can be a special-purpose computer that provides file service relating to the organization of information on data storage devices 242, e.g., hard disk drives or solid state drives. The illustrated storage server 102 comprises one or more processors 202 (e.g., single or multi-core processors), memory 206, a network adapter 214, and a storage adapter 216 interconnected by a system bus (not illustrated). The storage server 102 also includes an operating system 204 that implements a file system to logically organize the information as a hierarchical structure of directories and files on data storage devices 242. A processor 202 can cause the storage adapter 216 to read and write data from/to data storage devices 242.

In the illustrative embodiment, the memory 206 has storage locations that are addressable by the processor and adapters, e.g., for storing software program code and/or data. The processor and adapters may, in turn, comprise processing elements and/or logic circuitry configured to execute software code and manipulate data structures. The operating system 204, portions of which are typically resident in memory 206 and/or storage devices, and executed by the processors 202, functionally organizes stored data by, e.g., invoking storage operations in support of a file service implemented by the storage server 102.

The network adapter 214 comprises mechanical, electrical, and signaling circuitry needed to connect the storage server 102 to a client computing device 106 over network 104. The client computing device 106 may be a general-purpose computer configured to execute applications, e.g., a database application. Moreover, the client computing device 106 may interact with the storage server 102 in accordance with a client/server model of information delivery. That is, the client may request the services of the filer, and the filer may return the results of the services requested by the client, e.g., by exchanging data communications packets encapsulating a data communications protocol, e.g., in a common Internet file system (CIFS) protocol or network file system (NFS) protocol format.

The storage adapter 216 can cooperate with the operating system 204 executing on the storage server 102 to access information requested by a client computing device 106. The information may be stored on the data storage devices 242, e.g., in logical "volumes." The storage adapter 216 includes input/output (I/O) interface circuitry that couples to the data storage devices 242 over an I/O interconnect arrangement, e.g., a conventional high-performance, Fibre Channel serial link topology, SAS, SCSI, SATA, etc. The storage adapter 216 can communicate with the data storage devices 242 over a network (or switch) 230. The data storage devices 242 can be housed in an enclosure 240, e.g., in the same rack as the storage server 102 or a different rack.

The storage server 102 can include an agent 206 that exposes an API and can employ APIs provided by other storage components, e.g., to retrieve and provide performance-related data, operational data, configuration data, etc.

The storage server 102 can include a workload analyzer 220. The workload analyzer can instead be a component completely separate from the server 102. The workload analyzer can receive data traffic, e.g., duplicated data traffic, to determine how to optimally configure the storage system or storage network, e.g., by adding or reconfiguring data storage devices, whether virtual or physical.

Although components 202 are indicated to be associated with a data storage server, they may also or instead be associated with a different type of server, e.g., a management console server.

Figure 3:
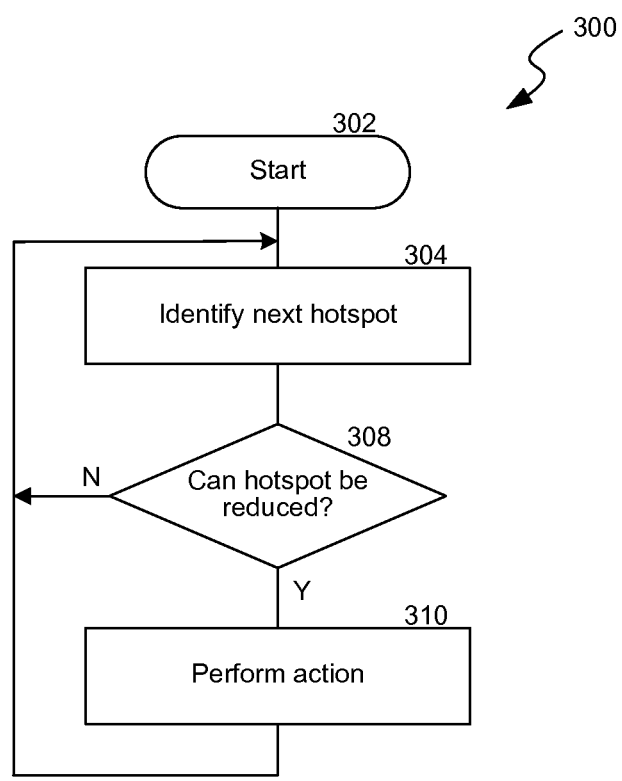
FIG. 3 is a flow diagram illustrating a routine invoked by the disclosed technology in various embodiments.

FIG. 3 is a flow diagram illustrating a routine 300 invoked by the disclosed technology in various embodiments. The routine 300 begins at block 302. At block 304, the routine 300 identifies a next hotspot. During a first iteration, the routine 300 identifies a first hotspot, e.g., a storage component whose utilization or capacity exceeds a threshold value. During a subsequent iteration, the routine 300 identifies a component in the data path that also has a hotspot, e.g., a different component from which data is received or to which data is sent. At decision block 308, the routine determines whether the hotspot can be reduced. As examples, the hot spot may be capable of being reduced by adding hardware or an additional virtual component. If true, the routine continues at block 310 to perform an action corresponding to the determination at decision block 308 on how to reduce the hotspot, and returns to block 304. If false, the routine returns to block 304. The action can be to cause a reconfiguration, alert a system administrator, etc.

Figure 4:
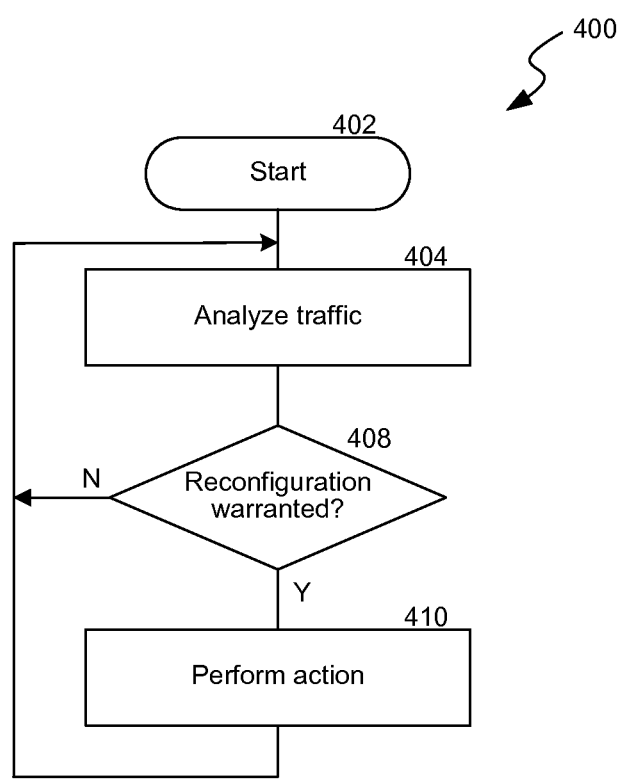
FIG. 4 is a flow diagram illustrating a routine invoked by the disclosed technology in various embodiments.

FIG. 4 is a flow diagram illustrating a routine 400 invoked by the disclosed technology in various embodiments, e.g., by a workflow analyzer component. The routine 400 begins at block 402. At block 404, the routine 400 analyzes data storage traffic, e.g., duplicated data storage traffic that is mirrored to the workflow analyzer. At decision block 408, the routine determines whether reconfiguration is warranted. As an example, the routine may determine whether the data storage traffic is not in conformance with one or more service level objectives. Various techniques exist on how to make this determination. If true, the routine continues at block 410 to perform an action corresponding to the determination at decision block 408, and returns to block 404. If false, the routine returns to block 404. The action at block 410 can be to reconfigure a component or suggest, e.g., to a system administrator, what components should be reconfigured.

Those skilled in the art will appreciate that the logic illustrated in FIG. 3 and described above, and in each of the flow diagrams discussed below, may be altered in a variety of ways. For example, the order of the logic may be rearranged, substeps may be performed in parallel, illustrated logic may be omitted, other logic may be included, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a server, comprising:
providing an application program interface by the server for a virtual data storage component from among a plurality of virtual data storage components operating within a virtualized environment for storing and accessing data for clients using physical resources accessible to the server via a network;
receiving, via the application program interface by a processor of the storage server, from an application, a command to query a data storage attribute associated with the virtual data storage component; wherein the data storage attribute relates to one or both of network traffic and data storage commands;
querying by the processor the associated virtual data storage component based on the command;
returning by the processor to the application a value for the data storage attribute;
identifying by the processor a first hotspot based on the data storage attribute value, where the hotspot indicates peak demand for the virtual data storage component in the virtual environment;
selectively checking by the processor data flow in a data path of the virtual data storage component to identify a second hotspot involving an intermediary component as one of a source of data and target of data causing the first hotspot; wherein an application program interface provided by the intermediary component is used to retrieve performance and configuration data for the intermediary component;
reducing the second hotspot by the processor by one or both of adding a physical resource and an additional virtual data component;
dynamically mirroring storage operations transiting the virtual data storage component to a workload analyzer executed by the processor;
using the mirrored storage operations by the workload analyzer to determine an actual workload involving the virtual data storage component;
comparing by the workload analyzer the actual load to a service level objective for data storage traffic;
dynamically providing by the workload analyzer a recommendation to make configuration changes to meet the service level objective; and
using one or more application program interface provided by one or more data storage components to one or more of enable, disable and modify one or more of a physical and virtual resource for the configuration changes.

2. The method of claim 1, wherein the data storage component is one or more of a virtual data storage volume, a virtual server, or a virtual networking component.

3. The method of claim 1, wherein the second hot spot is at least one of an application, an intermediary component, or a virtual or physical storage volume.

4. The method of claim 1, further comprising, based on the identified second hot spot, recommending a storage configuration.

5. The method of claim 4, wherein the recommendation is for adding one or more of a cache, a volume and a storage server.

6. The method of claim 1, wherein the workload analyzer reviews network traffic between a specified virtual or physical computing device and one or more data storage components.

7. A non-transitory computer-readable storage medium storing instructions, comprising:
instructions for providing an application program interface by the server for a virtual data storage component from among a plurality of virtual data storage components operating within a virtualized environment for storing and accessing data for clients using physical resources accessible to the server via a network;
instructions for receiving, via the application program interface by a processor of the storage server, from an application, a command to query a data storage attribute associated with the virtual data storage component; wherein the data storage attribute relates to one or both of network traffic and data storage commands;
instructions for querying by the processor the associated virtual data storage component based on the command;
returning by the processor to the application a value for the data storage attribute;
instructions for identifying by the processor a first hotspot based on the data storage attribute value, where the hotspot indicates peak demand for the virtual data storage component in the virtual environment;
instructions for selectively checking by the processor data flow in a data path of the virtual data storage component to identify a second hotspot involving an intermediary component as one of a source of data and target of data causing the first hotspot; wherein an application program interface provided by the intermediary component is used to retrieve performance and configuration data for the intermediary component;
instructions for reducing the second hotspot by the processor by one or both of adding a physical resource and an additional virtual data component;

instructions for dynamically mirroring storage operations transiting the virtual data storage component to a workload analyzer executed by the processor;

instructions for using the mirrored storage operations by the workload analyzer to determine an actual workload involving the virtual data storage component;

instructions for comparing by the workload analyzer the actual load to a service level objective for data storage traffic;

instructions for dynamically providing by the workload analyzer a recommendation to make configuration changes to meet the service level objective; and instructions for using one or more application program interface provided by one or more data storage components to one or more of enable, disable and modify one or more of a physical and virtual resource for the configuration changes.

8. The non-transitory computer-readable storage medium of claim 7, wherein the second hot spot is at least one of an application, an intermediary component, or a virtual or physical storage volume.

9. The non-transitory, computer-readable storage medium of claim 7, wherein the recommendation is for adding one or more of a cache, a volume and a storage server.

10. The non-transitory computer-readable storage medium of claim 7, wherein the workload analyzer reviews network traffic between a specified virtual or physical computing device and one or more data storage components.

11. The non-transitory computer-readable storage medium of claim 7, wherein the data storage component is one or more of a virtual data storage volume, a virtual server, or a virtual networking component.

12. A system, comprising:
a memory containing machine readable medium comprising machine executable code having stored thereon instructions; and a processor module of a server coupled to the memory, the processor module configured to execute the machine executable code to:

provide an application program interface by the server for a virtual data storage component from among a plurality of virtual data storage components operating within a virtualized environment for storing and accessing data for clients using physical resources accessible to the server via a network;

receive, via the application program interface, from an application, a command to query a data storage attribute associated with the virtual data storage component; wherein the data storage attribute relates to one or both of network traffic and data storage commands;

query the associated virtual data storage component based on the command;

return to the application a value for the data storage attribute;

identify a first hotspot based on the data storage attribute value, where the hotspot indicates peak demand for the virtual data storage component in the virtual environment;

selectively check data flow in a data path of the virtual data storage component to identify a second hotspot involving an intermediary component as one of a source of data and target of data causing the first hotspot; wherein an application program interface provided by the intermediary component is used to retrieve performance and configuration data for the intermediary component;

reduce the second hotspot by the processor by one or both of adding a physical resource and an additional virtual data component;

dynamically mirror storage operations transiting the virtual data storage component to a workload analyzer executed by the processor;

use the mirrored storage operations by the workload analyzer to determine an actual workload involving the virtual data storage component;

compare by the workload analyzer the actual load to a service level objective for data storage traffic;

dynamically provide by the workload analyzer a recommendation to make configuration changes to meet the service level objective; and use one or more application program interface provided by one or more data storage components to one or more of enable, disable and modify one or more of a physical and virtual resource for the configuration changes.

13. The system of claim 12, wherein the second hot spot is at least one of an application, an intermediary component, or a virtual or physical storage volume.

14. The system of claim 13, wherein the recommendation is for adding one or more of a cache, a volume and a storage server.

15. The system of claim 12 wherein the workload analyzer reviews network traffic between a specified virtual or physical computing device and one or more data storage components.

16. The system of claim 12, wherein the data storage component is one or more of a virtual data storage volume, a virtual server, or a virtual networking component.

* * * * *